Dec. 15, 1959  D. G. UNTHANK ET AL  2,917,178
APPARATUS FOR SEPARATING LIQUIDS OF
DIFFERENT SPECIFIC GRAVITIES
Filed March 31, 1958  4 Sheets-Sheet 2

INVENTORS
Douglas G. Unthank
Leslie Bristow
BY
Ralph B. Stewart
ATTORNEY

Dec. 15, 1959   D. G. UNTHANK ET AL   2,917,178
APPARATUS FOR SEPARATING LIQUIDS OF
DIFFERENT SPECIFIC GRAVITIES
Filed March 31, 1958   4 Sheets-Sheet 3

INVENTORS
Douglas G. Unthank
Leslie Bristow
BY
Ralph B. Stewart
ATTORNEY

United States Patent Office 2,917,178
Patented Dec. 15, 1959

2,917,178

APPARATUS FOR SEPARATING LIQUIDS OF DIFFERENT SPECIFIC GRAVITIES

Douglas George Unthank and Leslie Bristow, London, England, assignors of one-third to Henry Arthur John Silley, London, England Application March 31, 1958, Serial No. 725,392

Claims priority, application Great Britain April 2, 1957

3 Claims. (Cl. 210—305)

The present invention is concerned with improvements in and relating to apparatus for separating liquids of different specific gravities, such as oil and water, and an object of the invention is to provide a separator of simple and inexpensive construction particularly suitable for use where the required total quantity of liquid mixture to be dealt with is relatively small.

According to the present invention there is provided apparatus for separating liquids of different specific gravities, such apparatus comprising a closed tank, an inlet conduit for leading a mixture of the liquids to be separated, from the exterior to the interior of the tank and delivering the mixture into the upper part of the tank but at a point spaced from the top thereof, a baffle in the tank below the delivery point of said inlet conduit to direct the flow of the entering mixture from said inlet conduit towards the side walls of the tank, an outlet for the separated liquid of lower specific gravity through the upper end of the tank and above the level of said baffle, an outlet conduit for the separated liquid of higher specific gravity having its inlet end at or near the lower end of the interior of the tank and leading to a point of discharge from the tank above the level of the delivery point of the inlet conduit and one or more perforated baffles in the flow path between said first mentioned baffle and the inlet end of said outlet conduit for the liquid of higher specific gravity said perforated baffle conforming substantially to the transverse cross sectional area of the tank.

Preferably, the apparatus includes at least two of the said perforated baffles disposed in series in the flow path, and they may be conical or frusto-conical in shape and mounted with the base of the cone uppermost. The apparatus may be provided in the flow path between the perforated baffle or baffles and the inlet end of the outlet conduit with a filter composed, for example, of glass wool, wire wool or expanded metal.

It is to be understood that the terms "upper" and "lower" are used with the apparatus considered as being mounted in the position of use.

The invention is illustrated in the accompanying drawings by way of example as applied to a separator for oil and water, in which.

Referring to Figs. 1 to 4 the separator here shown comprises a cylindrical tank 1 having circular upper and lower ends 2 and 3 the upper end 2 comprising a plate which is removable.

Figure 1:
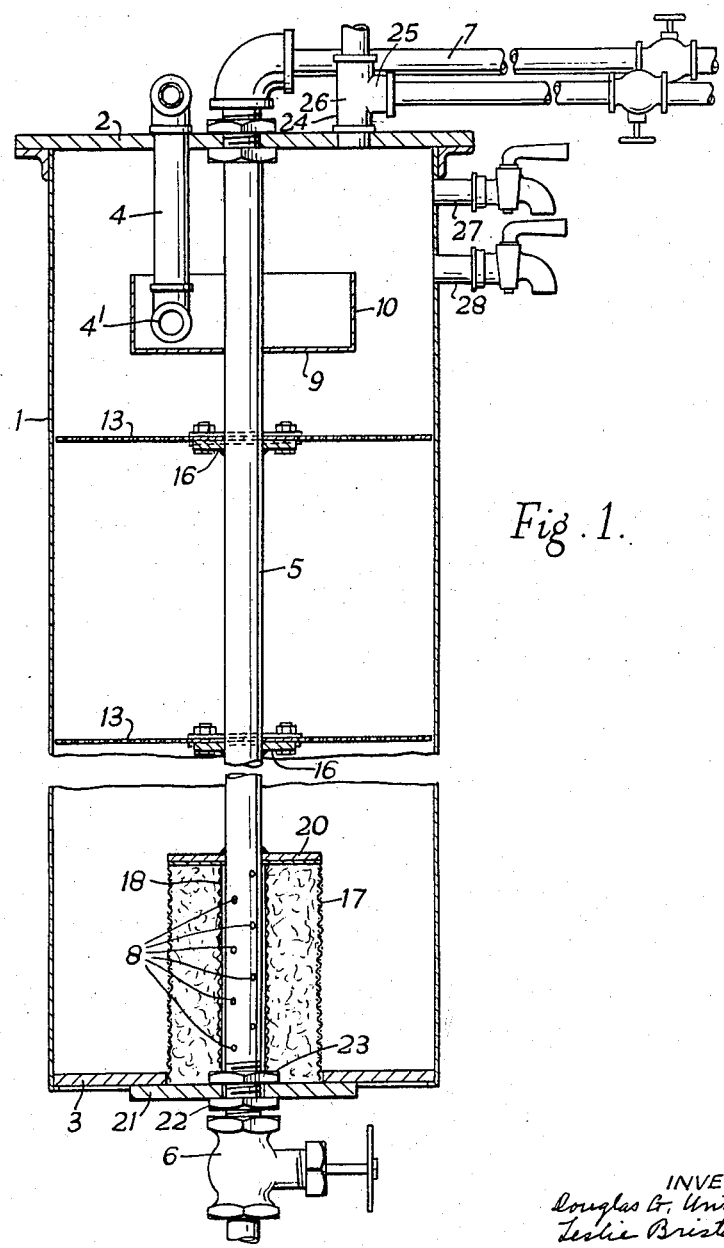
Fig. 1 is a view in sectional elevation showing a complete separator of one form.
Figure 2:
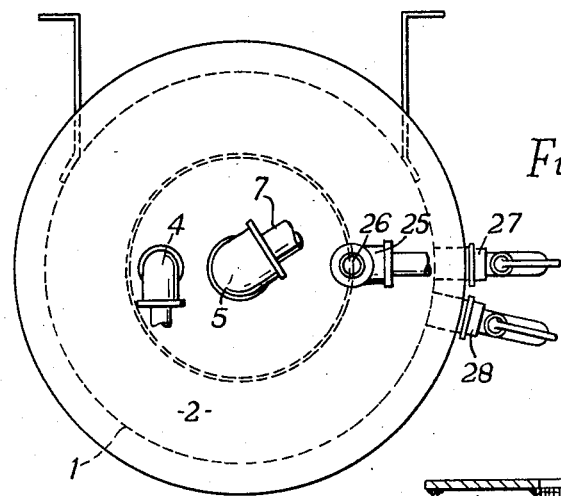
Fig. 2 is a plan view of Fig. 1.
Figure 4:
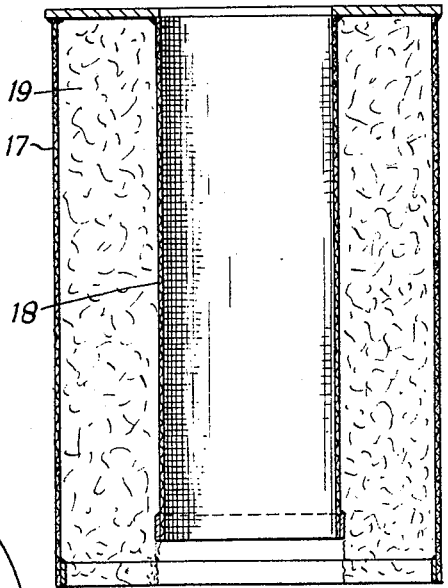
Fig. 4 is a sectional elevation on a larger scale of a filter as used in the separator of Fig. 1.

In the upper end plate 2 is sealed an inlet pipe 4 for the mixture of oil and water to be separated, the pipe 4 leading from the exterior for a short distance downwards from the top plate 2 as shown in Fig. 1, and being provided at its lower end with a T-piece 4'.

An outlet pipe 5 for separated water extends along the axis of the tank 1 and through the end plates 2 and 3 and is sealed in those plates and the lower end of the pipe 5 is closed outside the tank by a cock 6, whilst the upper end is connected with a take-off pipe 7.

A number of distributed perforations 8 are formed in the lower part of the outlet pipe 5 within the tank 1.

On the outside of the outlet pipe 5 immediately below the outlet end of the inlet pipe 4 is fixedly mounted a baffle formed by a circular plate 9 co-axial with the pipe 5 and formed with a peripheral flange 10 upstanding above the level of the outlet end of the inlet pipe 5 and constituting a concentric weir to be traversed by the incoming oil-water mixture.

Figure 3:
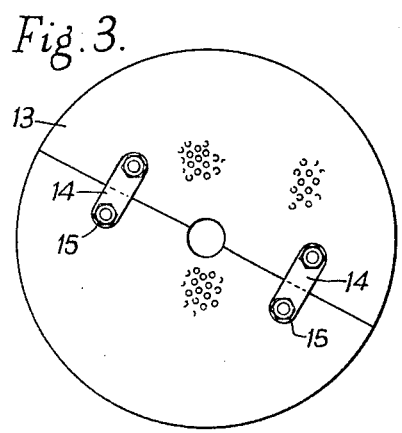
Fig. 3 is a plan view of a perforated baffle.

Perforated baffle plates 13 are mounted in spaced relationship in the flow path between the baffle 9 and the bottom of the tank 1 the perforated plates being formed each in two semi-circular halves as shown in Fig. 3 held together by straps and bolts 15 in encirclement of the pipe 5 and resting upon shelves 16 provided on the pipe 5.

In the lower end of the tank 1 and surrounding and enclosing the part of the pipe 5 containing the perforations 8 is a filter formed in the case illustrated of inner and outer concentric cylinders 17 and 18 of expanded metal, wire mesh or the like, the space 19 between the cylinders 17 and 18 being filled with glass wool or like filtering medium. The filter is mounted in a readily removable manner between the underside of a further shelf 20 on the pipe 5 and a central bottom closure or disc 21 forming part of the bottom 3 of the tank 1 and removable by uncoupling the cock 6 and a freeing nut 22 on the pipe 5, after which a further nut 23 may be released to free the filter for removal and cleaning or replacement, through the aperture in the bottom 3 of the tank exposed by removal of the disc 21.

An outlet for the lighter separated oil is provided through the upper wall 2 of the tank the said outlet comprising a T piece 24 arranged with the stem 25 of the T horizontal as shown and the cross piece 26 of the T vertical and open at its upper end to atmosphere so that air or gas accumulating in the tank 1 can escape by moving vertically upwards through the vertical cross piece 26 of the T whilst oil emerging from the tank 1 by way of the T piece 24 flows away through the stem 25 of the T.

Two test cocks 27, 28, are provided in the side wall of the tank 1 near the upper end thereof and with the lower test cock 28 at or immediately above the level of the edge of the weir 10 to enable the interface level between separated oil and water to be checked.

A separator as described above can operate continuously. The mixture to be separated enters by way of the pipe 4 and the stream is directed in opposite directions by the T piece 4' above the baffle plate and is caused by the weir 10 to flow outwards in a direction having an upward component and substantially symmetrically from the axis of the tank 1 so that a minimum turbulence occurs in the liquid flow. The lighter oil separating in the tank by flotation assisted by the perforated baffles 13 and 14 and the filter 17, 18, 19 rises to the upper part of the tank 1 and flows away by way of the horizontal arm 25 of the T piece 25 whilst the water traverses the perforated baffles 13, 14 and the filter 17, 18, 19 to enter the outlet conduit 5 by way of the apertures 8 and passes through the upper wall of the tank to the pipe 7.

As an example of a separator as described above capable of separating ½ ton of liquid per hour, the tank 1 is 54 inches long and 15 inches internal diameter. The perforated baffles of the kind shown at 13 and 14 are employed spaced at approximately 12, 24 and 36 inches from the top plate, the said baffles having 3/16 inch perforations. The filter is 9 inches long and formed of an inner perforated cylinder 18, 1 1/16 inches in diameter and an outer perforated cylinder 17, 6 inches in diameter.

Such a separator can operate for long periods automatically but should an excessive proportion of oil require to be separated for some periods the accumulation of oil in the top of the tank can be detected by means of the test cocks 27 and 28 and release of an excess of oil can take place through the cocks 27 or 28 or both.

The cock 6 beneath the lower end of the tank enables the tank to be drained of liquid when not in use or as a preliminary to servicing of the separator.

In the alternative embodiment shown in Figs. 5 to 8 primarily intended for use where smaller quantities of liquid are to be dealt with, the arrangement of the inlet pipe, deflecting baffle and weir and oil and water outlets is generally similar to that in the previously described construction.

In this case however, the perforated baffles are of frusto-conical form as shown at 29, fixedly mounted in any convenient manner on the water outlet conduit 5 and with the bases of the cones uppermost. The edges of the cones 29 are spaced from the walls of the tank by a distance preferably not greater than the diameter of the apertures on the baffles.

Figure 5:
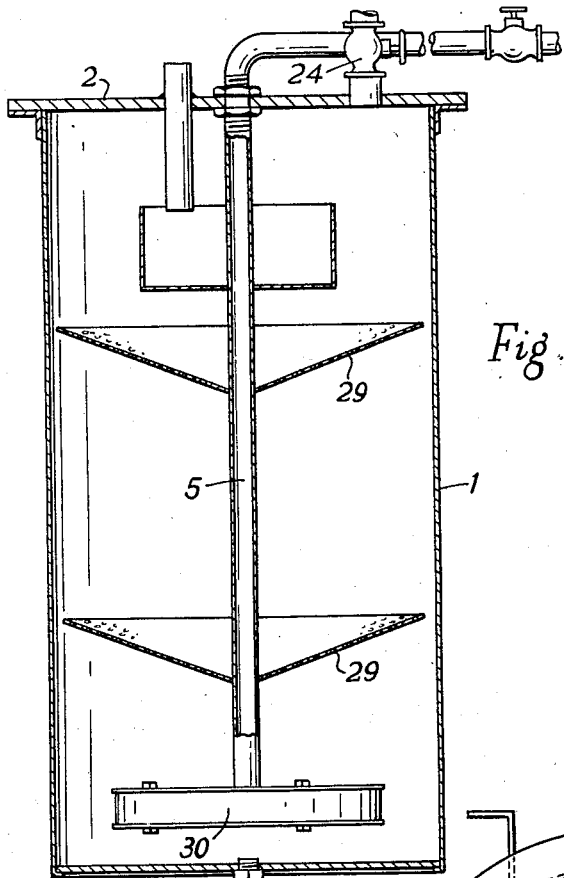
Fig. 5 is a view in sectional elevation showing an alternative construction of separator.
Figure 6:
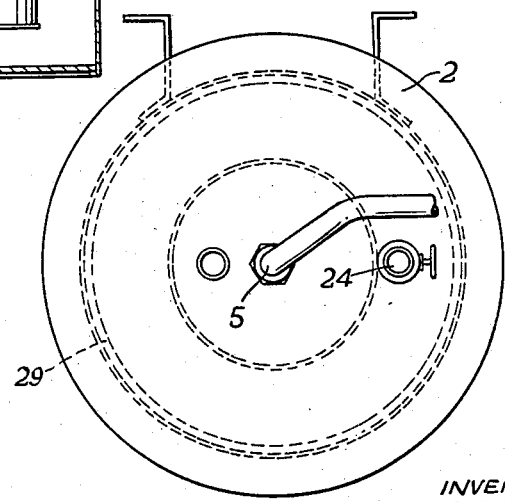
Fig. 6 is a plan view of Fig. 5.
Figure 7:
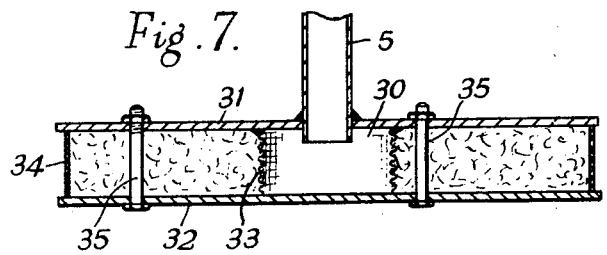
Figs. 7 and 8 are views in sectional elevation and plan respectively and on a larger scale of a filter as used with the separator of Fig. 5.
Figure 8:
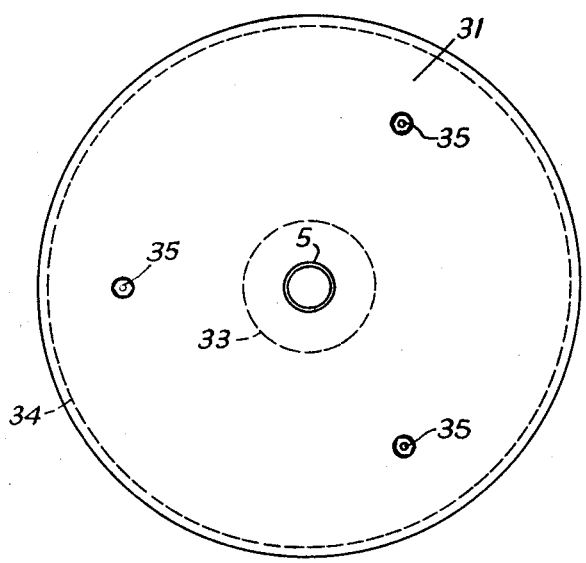

In this case the lower or inlet end of the outlet conduit 5 is spaced by a short distance from the bottom of the tank 1 as shown in Fig. 5 and an annular filter 30 is applied to the lower end of the conduit 5. The filter is formed by a pair of parallel discs 31, 32, spaced by inner and outer rings 33 and 34 of perforated metal, wire mesh or the like, the space between the rings 33 and 34 being packed with glass wool.

The upper disc 31, is apertured and applied over the end of the conduit 5 and fixed thereto e.g. by soldering or welding.

The discs 31 and 32 are connected by removable bolts 35 permitting dis-assembly of the filter for cleaning or replacement purposes.

In the construction according to Figs. 5 to 8 all the internal parts of the separator are carried by the removable top cover plate 2 of the tank and can therefore be removed as a whole with said top plate 2 from the tank for cleaning and servicing.

As an example a separator as shown in Figs. 5 to 8 capable of separating approximately ¼ ton of liquid per hour comprises a cylindrical tank 24 inches long and 12 inches internal diameter, two conical baffles being used mounted 7 inches and 14 inches from the upper end of the tank to the outer edge of the baffles. The filter 30 has an axial length of about 1 inch and the rings 33 and 34 are of 2 inches and 8½ inches diameter respectively and the lower plate 32 of the filter is spaced by about 1½ inches from the bottom of the tank 1.

We claim:

1. An apparatus for separating liquids of different specific gravities from mixtures thereof comprising an elongated hollow substantially cylindrical casing with top and bottom closing end walls, an axially located first outlet conduit for the liquid of higher specific gravity sealed in the wall of said casing in the region of the top closing end wall thereof and extending to the region of the bottom closing end wall of said casing and having its lower end open to the lower part of the space within the interior of the casing, an inlet conduit for the mixture of liquids to be separated sealed in the wall of said casing in the region of the upper closing end wall thereof and delivering into the upper part of the space within the casing, a fixed transversely extending annular deflecting baffle of smaller diameter than the said casing closely surrounding the said first outlet conduit and close beneath the delivery end of said inlet conduit, and a second outlet conduit for the separated liquid of lower specific gravity sealed through the wall of said casing in the region of the upper end closing wall thereof and having an inlet above both the said annular baffle and the delivery end of said inlet conduit, and at least one perforated baffle in the flow path between the said annular baffle and the lower entry end of the said first outlet conduit and conforming substantially with the transverse cross-sectional area between the cylindrical wall of the said casing and the said first outlet conduit.

2. An apparatus for separating liquids as claimed in claim 1 wherein the lower end of the said first conduit for the separated liquid of higher specific gravity is totally enclosed by an annular filtering body located wholly within the part of the space within the said casing below any perforated baffle.

3. An apparatus for separating liquids as claimed in claim 1 wherein the annular baffle is provided with an edge flange directed towards the upper closing end wall of the said casing and surrounding the delivery end of the said inlet conduit.

References Cited in the file of this patent

UNITED STATES PATENTS

| | | |
|---|---|---|
| 1,646,102 | Ostrander | Oct. 18, 1927 |
| 2,405,838 | Lawson et al. | Aug. 13, 1946 |
| 2,523,793 | Vance | Sept. 26, 1950 |